United States Patent Office.

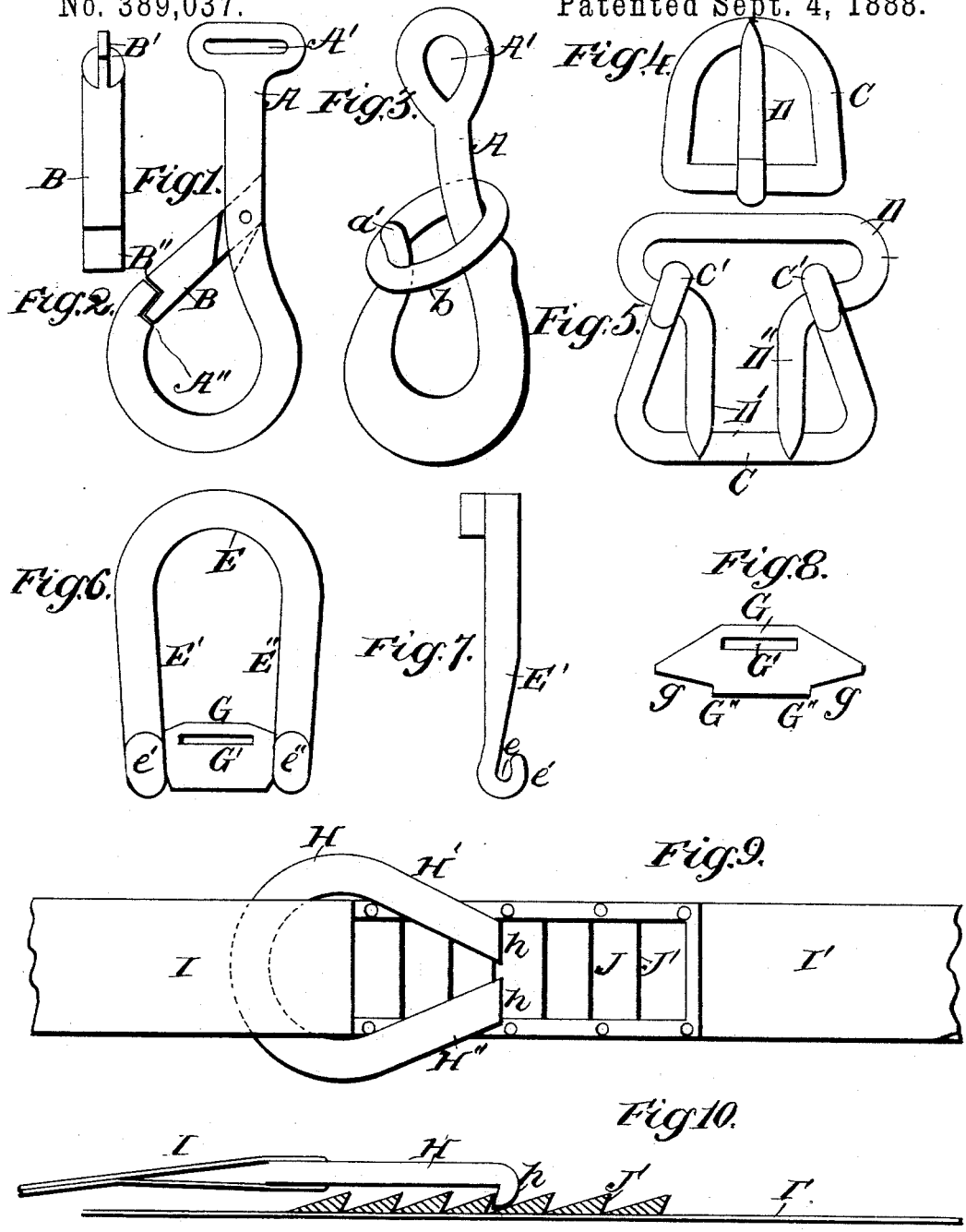

ERNEST WILKINSON, OF THE UNITED STATES NAVY.

AUTOMATIC FASTENING DEVICE.

SPECIFICATION forming part of Letters Patent No. 389,037, dated September 4, 1888.

Application filed May 19, 1888. Serial No. 274,394. (No model.)

*To all whom it may concern:*

Be it known that I, ERNEST WILKINSON, ensign in the United States Navy, stationed at Washington, in the District of Columbia, have invented certain new and useful Improvements in Automatic Fastening Devices, of which the following is a specification My invention has for its object to provide a new and useful construction in fastening devices; and it consists in the application of magnetism thereto, and in certain novel and simplified means for the application of the said magnetism, as will be hereinafter fully described and claimed, whereby the fastening is rendered secure against shocks, jars, and strains.

Referring to the accompanying drawings, in which corresponding parts are designated by similar letters, Figure 1 is a perspective view of a snap-hook constructed according to my invention. Fig. 2 is a detail perspective view of the latch forming a part thereof. Fig. 3 is a perspective view of a modification of the hook shown in Fig. 1. Fig. 4 is a perspective view of a buckle constructed according to my invention. Fig. 5 is a modification of the buckle shown in Fig. 4. Fig. 6 is a plan view of a fastener constructed according to my invention. Fig. 7 is a side view of the device shown in Fig. 6. Fig. 8 is a detail of the locking-bar of the device shown in Fig. 6. Fig. 9 is a plan view of fastener constructed according to my invention and adapted for use as a belt-clasp, and Fig. 10 is a longitudinal section thereof.

A, Fig. 1, represents a hook, having on one end or shank thereof a loop, A', for attaching a rope, chain, strap, &c., while upon the other or hook end is formed a bearing-face, A". This hook is preferably constructed of magnetized hard steel, forming a horseshoe-magnet with legs of unequal length, and has its two poles at A' and A", respectively. The latch B is hinged to the shank of the hook by means of the tongue B' upon one end thereof, while the opposite end of the latch has a bearing-face, B", corresponding to the bearing-face A" on the hook, against which it rests. The latch is preferably constructed of soft iron and acts as an armature for the magnet forming the hook A. If the latch B is withdrawn from the pole A" of the hook, to permit the passage of a ring, rope, &c., into the hook, it will, when released, be drawn against the bearing-face or pole A", as the magnetism of this point is much greater than that of the central portions of the hook. It will be thus seen that I avoid the use of springs, which have heretofore been common in snap-hooks, and which are liable to rust and break, causing the latch to cease to work and permitting the hook to become released from the rope, &c.

A, Fig. 3, represents a magnetized steel hook, of the form of a horseshoe-magnet, with poles of unequal length, having a loop, A', upon the shank thereof, as has been hereinbefore described. A link, b, of soft iron, slides upon the shank of the hook, its downward movement being regulated by the projection a upon the shank, and catches over the hook end a' of the hook, to which it is drawn by the magnetism thereof, thus strengthening the hook against strains tending to straighten it.

C, Fig. 4, represents a piece of iron forming the frame of a buckle, and D represents the tongue thereof hinged to the frame C. In this case either the buckle C or the tongue D may be magnetic, or both may be, having their poles reversed—that is, the like poles being opposite to one another and the unlike poles being in contact.

C, Fig. 5, represents a piece of soft iron forming the frame of a buckle, and D a horseshoe-magnet hinged in loops C' formed on the ends of the piece C. The poles D' and D" of D, which act as tongues of the buckle, draw the frame C toward them, causing it to act as an armature and close the buckle, as is also done in the arrangement described with reference to Fig. 4. These last two described modifications of my invention are particularly adapted for use on clothing, as the magnetism of the buckle keeps it constantly closed and locked against the withdrawal of the strap, which may be caught by the tongue or tongues.

Figs. 6, 7, and 8 represent a fastener especially adapted for use on garters or suspenders. Referring to these figures, E represents a horseshoe-magnet, upon the poles E' E" of which are lugs e' e" having recesses e, while upon the rear of the magnet a lug, F, is formed, by means of which one end of the suspender or garter may be attached to the magnet. A bar, G, having a slot, G', by means of which it is attached to the suspenders, garter, &c., has shoulders G" G"

formed upon its forward edge, while the projections $g$ $g$ extend sidewise therefrom into the recesses $e$ of the magnet. The shoulders $G''$ $G''$ prevent any lateral play of the locking-bar G, which is preferably constructed of soft iron and acts as an armature for the magnet E. The magnetism of E prevents the locking bar or armature G from shaking loose and out of the recesses $e$.

Figs. 9 and 10 represent a clasp adapted for fastening belts, and in which H represents a horseshoe-magnet, upon the poles $H'$ and $H''$ of which are lugs $h$, while one end, I, of the belt is fastened to the rear of the magnet. The opposite end, $I'$, of the belt is provided with a rack-bar, J, the teeth $J'$ of which have the inclination shown in Fig. 10—that is, those faces of the teeth that front the nearer end of the belt have a gradual incline, while the other faces of the teeth have an inclination in the same direction as the front teeth, but more acute. This rack-bar is constructed of soft iron, and the attraction of the magnet causes the lugs $h$ to engage the teeth $J'$ of the rack-bar and thus prevent the belt from becoming unfastened. It will be noted that the teeth $J'$ serve the purpose of the armature G, heretofore described.

Having now described my invention, what I claim, and desire to secure by Letters Patent of the United States, is—

1. As a new and improved article of manufacture, the herein-described fastener, consisting of a magnet and an armature adapted to be drawn thereto, whereby the two parts of the fastener are securely locked, as and for the purpose described.

2. As a new and improved article of manufacture, the herein-described fastener, consisting of a horseshoe-magnet having the form of a hook, and an armature acting as a latch pivoted to the central portion of the said hook, as and for the purpose described.

3. As a new and improved article of manufacture, the herein-described fastener, consisting of a horseshoe-magnet having the form of a hook, and an armature working upon the shank of the said hook and attracted by the hook-pole thereof, as and for the purpose described.

4. As a new and improved article of manufacture, the herein-described fastener, consisting of a piece of curved metal and a tongue or armature pivoted thereto, one of the said parts being magnetized, as and for the purpose described.

In testimony whereof I have hereunto set my hand in presence of two witnesses.

ERNEST WILKINSON.

Witnesses:
C. S. WHITMAN,
C. FRED. KELLER.